United States Patent [19]

Grimsrud

[11] 4,247,085
[45] Jan. 27, 1981

[54] COMBINED BUMPER, JACK AND HOIST

[76] Inventor: Chris Grimsrud, Box 455, Wolf Point, Mont. 59201

[21] Appl. No.: 36,143

[22] Filed: May 4, 1979

[51] Int. Cl.³ .......................... B66C 23/60; B66D 3/00
[52] U.S. Cl. .................................. 254/86 R; 254/387; 254/327; 293/111
[58] Field of Search ...................... 254/139.1, 139, 166, 254/86 R, 4 R, 143; 293/111, 114, 118; 212/1, 8 R

[56] References Cited

U.S. PATENT DOCUMENTS

| | | | |
|---|---|---|---|
| 1,867,760 | 7/1932 | Richards | 254/86 R |
| 2,557,192 | 6/1951 | Leister | 212/8 R |
| 3,086,752 | 4/1963 | Wetter | 254/86 R |
| 3,631,991 | 1/1972 | Wacht | 254/139.1 X |

*Primary Examiner*—John M. Jillions
*Attorney, Agent, or Firm*—Bacon & Thomas

[57] ABSTRACT

A bumper for a vehicle equipped with a power operated winch. The bumper being longitudinally slidable in a guide that is pivoted to the vehicle on a fore-and-aft axis so the bumper can be placed in either a horizontal position to serve as a vehicle bumper or in a vertical position where it is also vertically slidable. A combined pulley and guide is positionable on either the guide or the bumper so that a cable from the winch can slide the bumper upwardly to function as a jack or lifter for an external load or to slide the bumper downwardly to function as a jack to lift the vehicle itself. A further pulley can be mounted on a wing pivoted to an end of the bumper and the winch cable can thus be directed over that further pulley to function as a hoist. Locking pins are provided to lock the bumper in selected positions along its guide.

8 Claims, 9 Drawing Figures

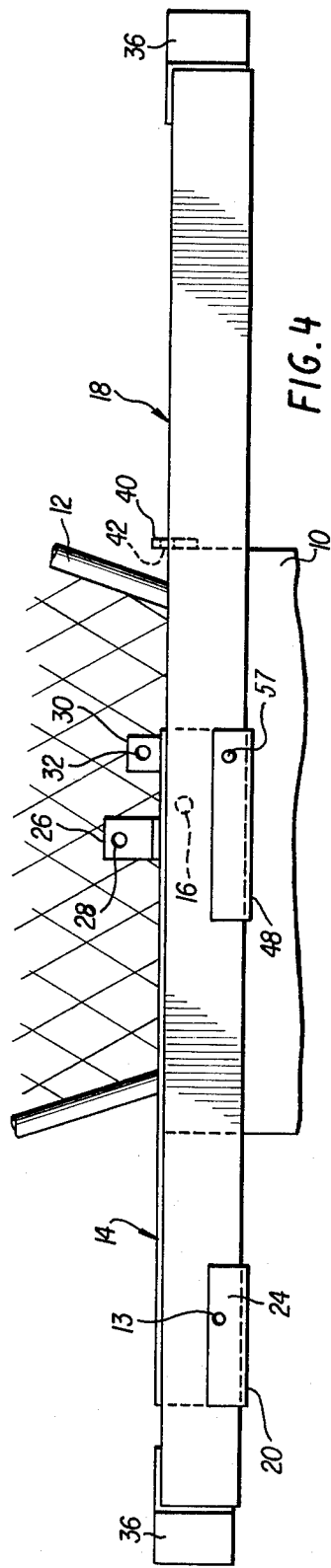
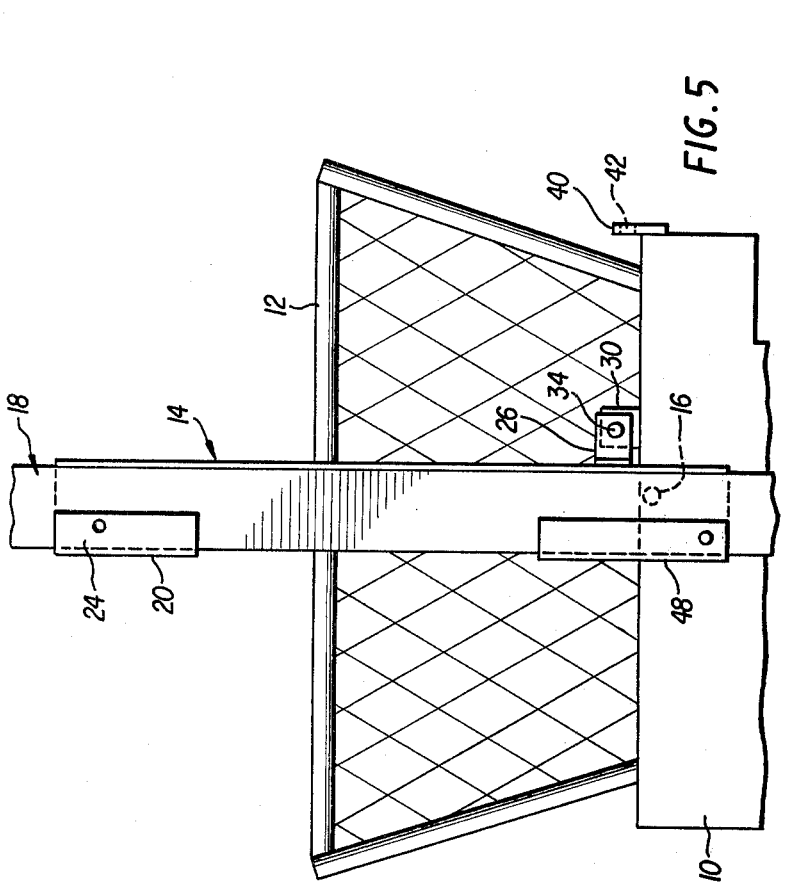

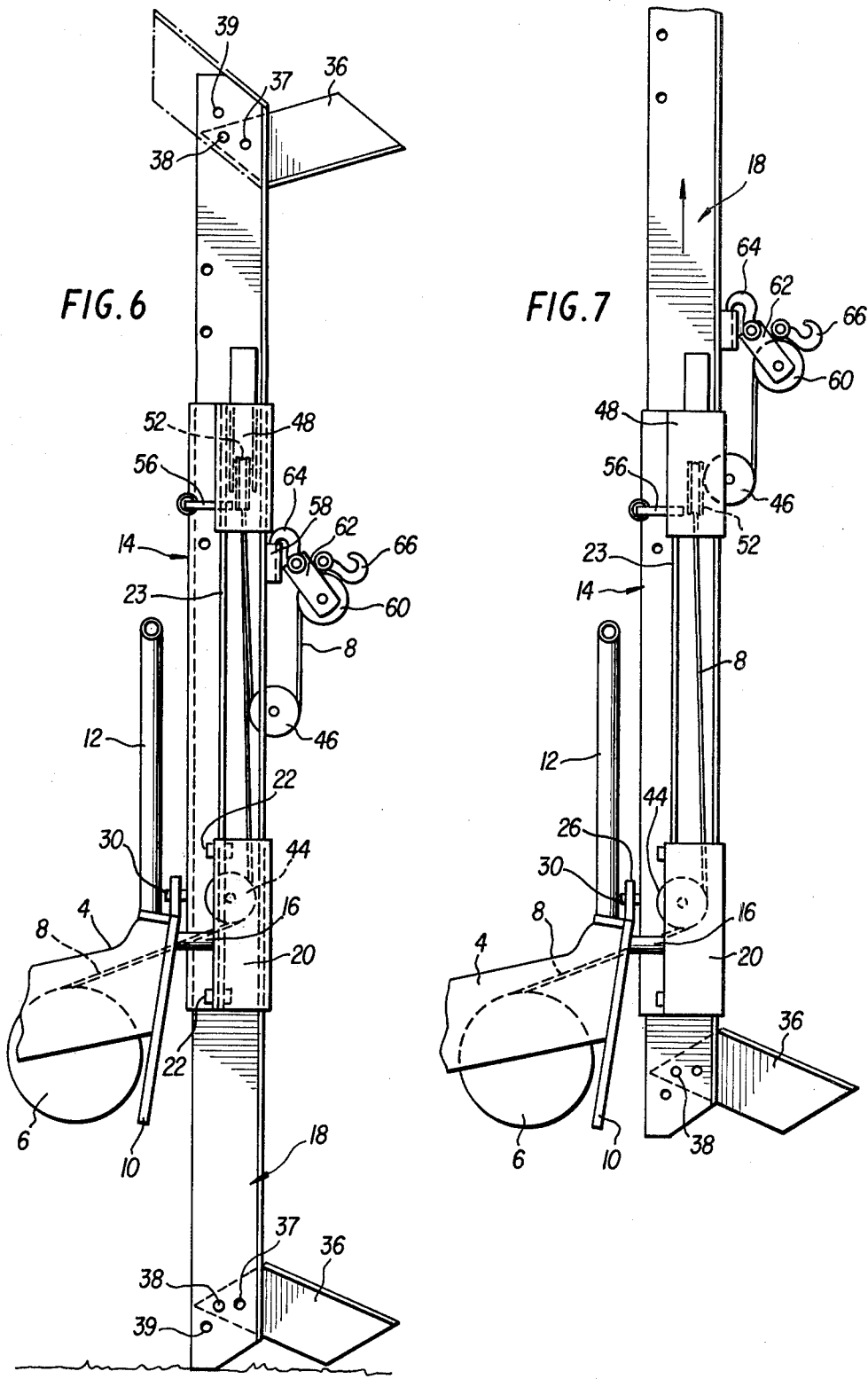

COMBINED BUMPER, JACK AND HOIST

BACKGROUND OF THE INVENTION

This invention is in the field of power operated jacks and/or hoists for vehicles.

It has been proposed to provide vehicle bumpers with means to permit tilting them from a horizontal to a vertical position and means, either a part of the bumper or an adjunct carried by the bumper, which could be manually operated to serve as a jack to lift the vehicle. Such devices, however, were of questionable efficiency as bumpers and not only required manual power, but were limited to use as a jack for the carrying vehicle itself. See as examples, the U.S. patents to Sjolander Nos. 1,326,795; 1,530,429; and 2,077,275.

SUMMARY OF THE INVENTION

The present invention provides a multi-utility bumper device of rugged construction, a bumper being slidable along a guide which in turn is pivoted to a vehicle about a fore-and-aft axis. When in a horizontal position it serves as a vehicle bumper and when in a vertical position, the cable from a winch mounted on the vehicle can be used to slide the bumper in a selected direction along the guide to either lift the vehicle or serve as a hoist or jack for an external load. Means are provided for lifting a load engaged directly by the bumper or for selectively directing the winch cable in a manner to function as a low-level or high-level hoist. When used as a low-level or high-level hoist, the bumper itself acts as a mast or spar and one end may rest directly on the ground.

BRIEF DESCRIPTION OF THE DRAWINGS

FIG. 4 is a front elevational view of the bumper in a horizontal position when serving as a conventional bumper.

FIG. 5 is a view similar to FIG. 4, but showing the bumper swung to a vertical position; and FIGS. 6, 7, 8 and 9 are side views of the apparatus with the bumper in its vertical position and showing different modes of operation.

DESCRIPTION OF THE PREFERRED EMBODIMENT

Figure 1:
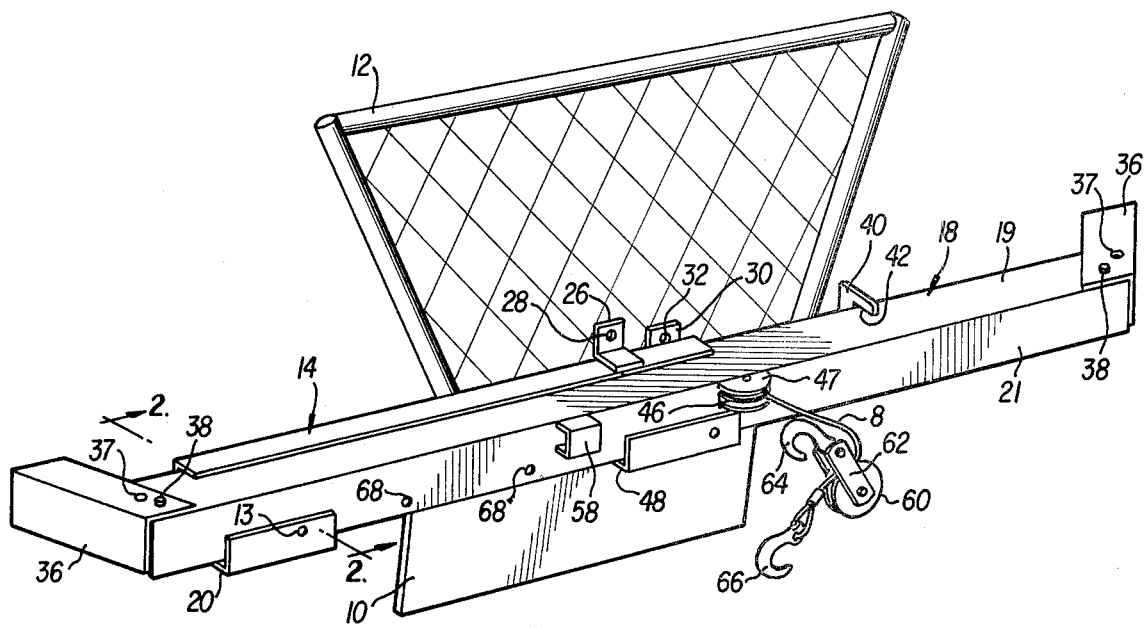
FIG. 1 is a perspective view of a bumper device embodying the present invention.

In each of the Figures, some of the structural features or elements have been omitted for clarity of illustration, these features being shown in other Figures.

The bumper of the present invention is intended for use with a vehicle such as a pickup truck equipped with a power operated winch. Such trucks are conventional and will not be further described, except to point out that in FIGS. 6, 7, 8 and 9, a forward portion of the vehicle frame is shown at 4, and a winch drum 6 is schematically illustrated as being mounted on the vehicle and operable in the usual manner to pull in or pay out a cable 8.

A mounting plate 10 is secured to the vehicle frame 4 in any suitable manner to be held rigidly and fixedly thereon. The mounting plate 10 also supports a protective grill 12 to protect the radiator of the vehicle during operation of the present invention.

Figure 2:
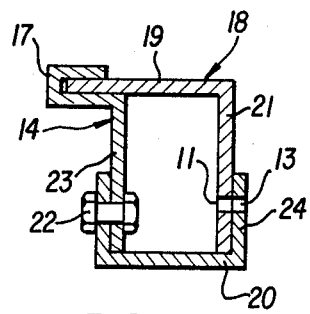
FIG. 2 is a transverse sectional view taken along the line 2—2 of FIG. 1.

An elongated guide member 14 is pivoted to the support plate 10 on a pivot member 16 (see FIGS. 4, 5 and 6 to 8) for pivotal movement about a fore-and-aft axis relative to the vehicle. The guide 14 is of the general sectional shape shown in more detail in FIG. 2, and includes a channel portion 17 arranged to slidably receive an edge of the upper flange 19 of an L-shaped bumper 18. The bumper 18 is of L-shape in cross section, and is provided with a second or front flange 21 extending parallel to a flange 23 of the guide 14, but spaced therefrom. Adjacent one end of the guide 14 a channel-shaped holding member 20 is bolted to the guide 14 by bolts 22 and is provided with an outer flange 24 to slidably engage and guide the front flange of the bumper 18.

The bumper guide 14 is also provided with a bracket 26 (FIGS. 1, 4 and 5) welded or otherwise secured thereto, and having an opening 28 therein. The support plate 10 is provided with a bracket or plate 30 rigidly fixed thereon and also provided with an opening 32 therein. The openings 28 and 32 are positioned equidistant from the pivot 16, and so spaced that the bumper may be swung from its horizontal position shown in FIG. 4 to a vertical position as shown in FIG. 5, at which time the openings 28 and 32 will be in alignment. A removable pin 34 may be placed in the aligned opening 28–32 when the bumper is in its vertical position to thus lock the bumper guide in that position. The brackets 26 and 30 are so positioned, that a rotation of 90° (clockwise as seen in FIG. 1) about pivot 16 will swing the bumper from its horizontal to its vertical position and align the openings 28 and 32.

At each of its ends, the bumper 18 is provided with wings 36, L-shaped in section, pivoted thereto and adapted to be swung rearwardly to the position shown in FIG. 1 when the bumper is horizontal and which wings serve as the usual bumper ends extending outside the front fenders of the vehicle. However, since each bumper wing is pivotally mounted on the bumper ends, by pivots 38, they may be swung to extend forwardly of the bumper, as shown in FIGS. 6–9. The wings 36 and the bumper 18 are also provided with openings 37 and 39 (see FIG. 6) which become aligned when the wings are in either their forward or rearward position, so that a further pin may be placed in those openings to lock the wings in that position.

Fixedly secured to one end of the mounting plate 10 is a keeper member 40. The keeper member is provided with a slot 42, best seen in FIGS. 1 and 5, that normally embraces the rear edge of the upper flange 19 of the bumper 18 when the latter is in its horizontal or bumper-functioning position. The bumper 18 and guide 14 are also provided with openings 11 and 13 (See FIG. 2) which are aligned when the bumper is in its horizontal position of FIG. 4, and a removable pin may be inserted through those aligned openings to hold the bumper against lateral sliding movement. The keeper 40 prevents any pivotal movement of the bumper and guide about pivot 16 at this time.

When it is desired to swing the bumper to the vertical position of FIG. 5, the wing at the right-hand end of the bumper as seen in FIG. 4 is swung forwardly so that the adjacent end of the upper flange of the bumper 18 is free. The pin in openings 11 and 13, previously described, is removed and the bumper then may be slid toward the left in its guide 14 until the right-hand end of flange 19 clears the keeper 40. At this time, that end of the bumper may be swung downwardly to the vertical position, shown in FIG. 5, and the pin 34 then placed in the aligned openings 28 and 32 to lock the bumper guide in this vertical position.

Journalled on the web portion of the channel-shaped member 20 is a first pulley 44 over which the cable 8 from the winch 6 can be trained to extend longitudinally of the guide 14 and bumper 18 in the space between the flanges thereof. Further pulley means, to be described, may be employed to direct the cable 8 outwardly of the bumper and guide assembly. Those further pulley means include, in part, a "third" pulley 46 journalled on a plate 47 fixed to the bumper itself (see FIGS. 1 and 3), that is, the pulley 46 extends through an opening 49 in the front flange of the bumper and best seen in FIG. 3 of the drawings.

Figure 3:
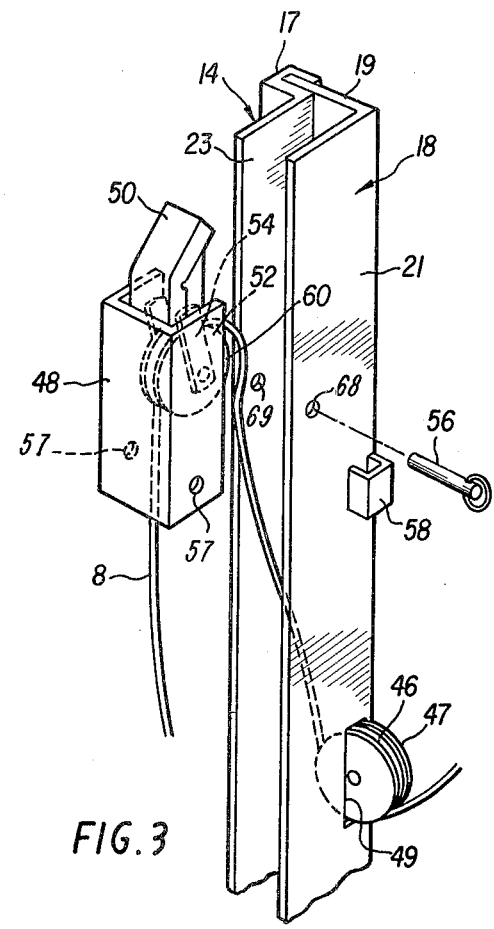
FIG. 3 is a fragmentary perspective view of portions of the apparatus.

A further portion of the further pulley means is also shown in FIG. 3, wherein a channel member 48 is of essentially the same dimensions, shape and size as the channel member 20, previously described, but which is not permanently attached to either the bumper or its guide. The channel member 48 can span and embrace the flanges of the bumper guide 14 and the front flange of the bumper 18, similarly to the showing in FIG. 2, but unattached thereto. The channel member 48 is provided with a fixed bracket 50 by which a second pulley 52 is supported and which is journalled on arms 54 extending from bracket 50. The channel member 48 is provided with openings 56 in its opposed side flanges and the bumper 18 and the bumper guide 14 are provided with openings 58 and 60, respectively, adapted to be aligned with either of the openings 56 when the channel member 48 embraces the bumper and its guide, as will be described. As can be seen from FIGS. 6–9, when the channel member 48 is in the embracing relation to the guide 14 and bumper 18 as set forth above, the cable 8 from winch 6 can be trained, first over the pulley 44 to extend upwardly in the space between the bumper and guide, then over the pulley 52 to reverse direction downwardly from where it can be trained over pulley 46 to extend outwardly of the bumper and guide assembly. A removable pin 56 is provided and which may be selectively positioned through an opening 57 and opening 68 to lock the channel member 48 relative to the bumper 18, or it may be positioned in the other hole 56 and hole 69 of the bumper guide to lock the channel member 48 against movement along the guide 14, its outer flange slidably guides the front flange of the bumper 18.

Welded or otherwise permanently secured to the front flange of the bumper 18 is a bracket or loop 58.

Figure 8:
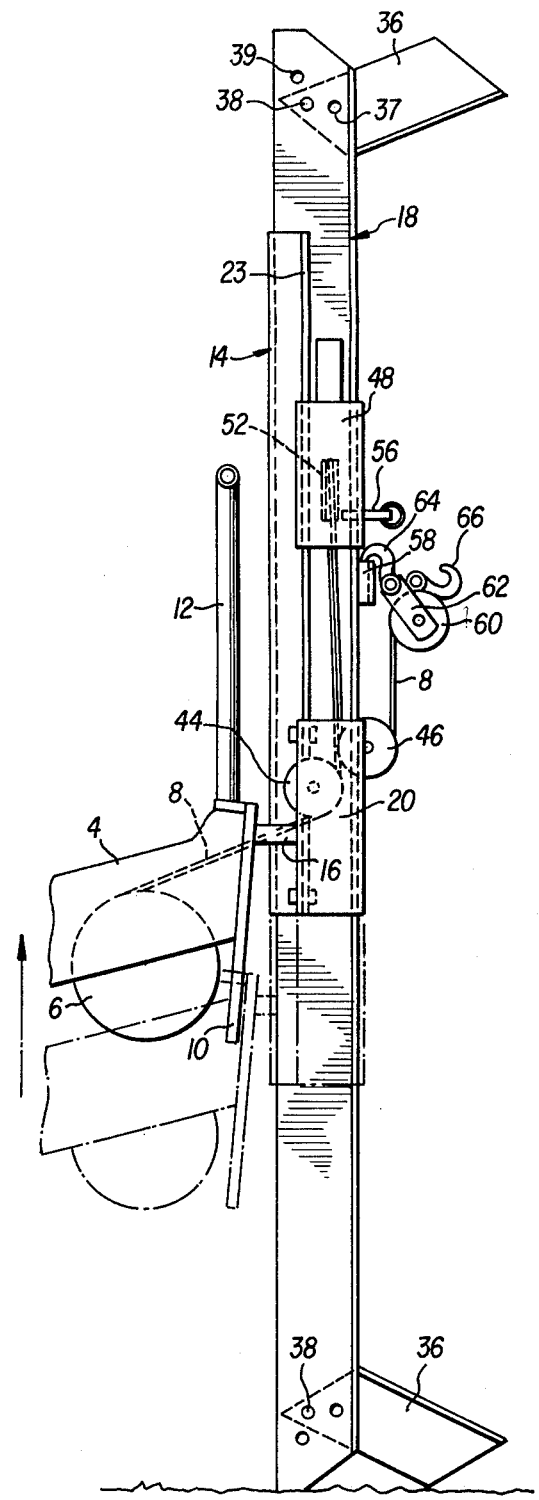

A fourth pulley 60 is journalled in a yoke member 62 carrying a hook 64. As best shown in FIGS. 6–8, the cable 8 is provided with a load hook 66 fixed to its outer end.

Refer now to FIG. 6 which shows the bumper in its vertical position and with the channel member 48 locked to the bumper guide 14 by pin 56. The cable 8 is trained as shown and the hook 64 is shown engaged with the bracket or loop 58. It will be apparent that the bumper is readily slidable vertically in its guide 14 and, with the cable arrangement shown, operation of the winch drum 6 to draw cable 8 inwardly and wind the same on the drum will result in the bumper being pulled upwardly. With the lower wing 36 turned outwardly and locked in its outward position, as shown in FIG. 6, the same may be used as a jack to lift adjacent vehicles for whatever purpose desired or to lift fairly heavy articles in the nature of a fork-lift truck or the like. FIG. 7 shows the bumper in its upward position as it would be after being operated in the manner just described.

In FIG. 8, the pin 56 is so positioned that the channel member 48 is locked against movement relative to the bumper 18, but is slidable along the guide 14. With the cable arranged the same as described with reference to FIG. 6, tension on the cable 8 will result in a downward sliding movement of the bumper 18 and that continues until the bumper end engages the ground as shown in FIG. 8. Thereafter continued operation of the winch will result in lifting the front end of the vehicle frame 4 from the dotted line position of FIG. 4 to the full line position, so that the vehicle becomes a self-jacking apparatus. At this time a pin in aligned openings 13 and 68 can lock the apparatus with the vehicle raised off the ground.

With the parts arranged as shown in FIG. 8, the cable 8 may be paid out and the hook 66 engaged with an external load to be lifted. In this mode, the apparatus functions as a low-level hoist.

Figure 9:
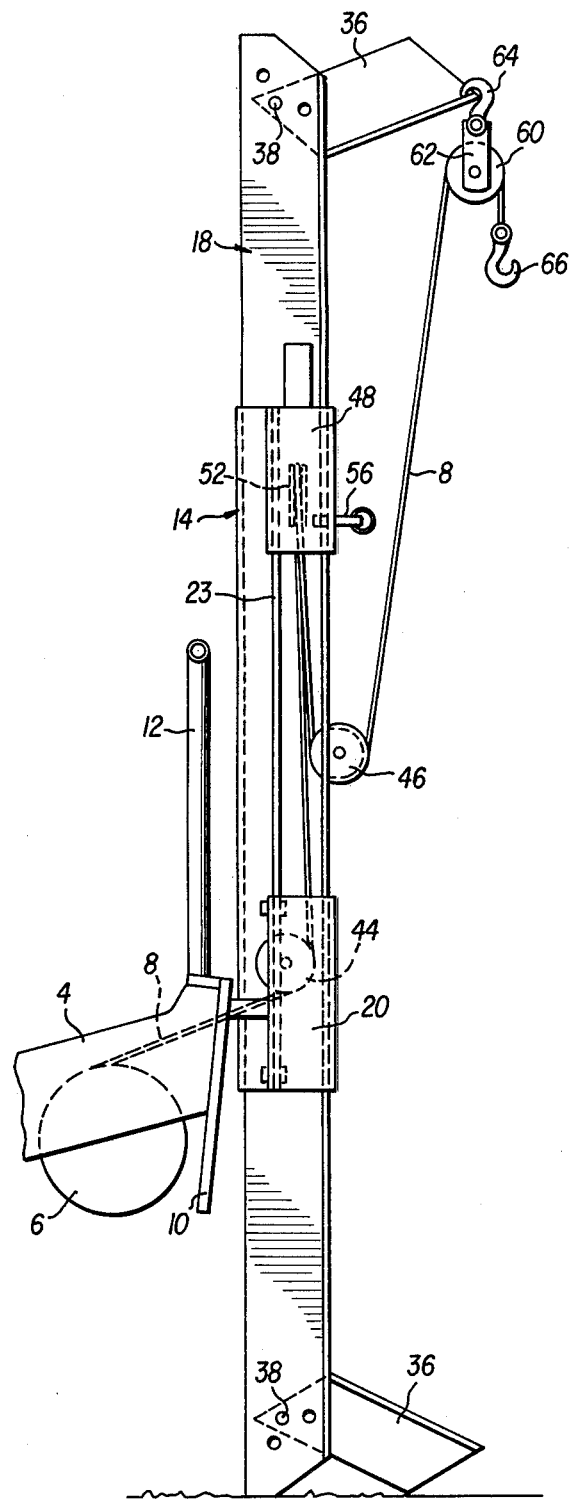

In FIG. 9, the hook 64 is removed from the loop 58 and hooked on to the end of the upper wing 36 which has been swung to the forward position shown. The pin 56 is still in position to lock the channel member 48 against sliding movement relative to the bumper 18. In this configuration, the bumper may be locked against sliding movement relative to its guide 14 by aligning the opening 13 with a selected opening 68 (FIG. 1) in the bumper, and operation of the winch will obviously function to raise or lower the hook so that the same may be employed to hoist external loads. This mode of operation makes it a high-level hoist.

When lifting relatively heavy loads, it is not desired that the entire weight of the load be imposed on the pivot 16. In such a case, the bumper is lowered to the position of FIG. 9 so that it rests on the ground and the bumper thus acts as a spar or mast for the hoist and the ground engaged by the bumper supports the major portion of the load.

It will be obvious that, even with the bumper in its horizontal position, the load hook 66 and winch 6 may be used for winching the vehicle out of a mud hole or for similar winching operations.

While a single specific embodiment of the invention has been shown and described herein, the same is merely illustrative of the principals involved, and other forms may be resorted to within the scope of the appended claims.

I claim:

1. Apparatus for a vehicle having a powered winch thereon, comprising:
   an elongated member;
   a guide slidably supporting said member for longitudinal sliding movement;
   means for mounting said guide on said vehicle for pivotal movement about an axis extending fore-and-aft of said vehicle, for pivotally mounting said member in either a horizontal position or a vertical position;
   first pulley means including a first pulley fixed relative to said guide, when in its vertical position, for directing a cable from said winch upwardly along said guide and member; and
   further pulley means including a second pulley selectively mountable on one of said guide and member for directing said cable outwardly for selective securement to said member or to an external load.

2. Apparatus as defined in claim 1 including holding means fixed on said vehicle and slidably embracing a portion of said member adjacent an end thereof, when said member is in its horizontal position, to prevent pivotal movement of said member and guide about said axis; said member being slidable horizontally to clear said holding means, and means for selectively locking said member against sliding relative to said guide.

3. Apparatus as defined in claim 1 including means for selectively securing the end of said cable to said member whereby operation of said winch serves to slide said member upwardly when said second pulley is mounted on said guide and to slide said member downwardly when said second pulley is mounted on said member.

4. Apparatus as defined in claim 1 including means for selectively locking said member against sliding relative to said guide in a plurality of positions therealong.

5. Apparatus as defined in claim 1 wherein said member is provided with end wings pivoted thereto to extend rearwardly alongside said vehicle when said member is in its horizontal position but selectively pivotable to extend forwardly when said member is in its vertical position.

6. Apparatus as defined in claim 5 including releasable means for locking said wings in said rearwardly extending position and for selectively locking at least the lower wing in its forwardly extending position.

7. Apparatus as defined in claim 6 including a third pulley selectively mountable on the upper wing when the latter is swung forwardly, with the member in a vertical position, to guide said cable to serve as a high level hoist.

8. Apparatus as defined in claim 7 further including a fourth pulley journalled on an axis fixed to said member below said second pulley when said member and guide are vertical whereby when said cable is trained over said first, second and fourth pulleys it may be selectively secured to said member or directed to said third pulley.

* * * * *